US008689985B2

(12) United States Patent
Bates, III et al.

(10) Patent No.: US 8,689,985 B2
(45) Date of Patent: Apr. 8, 2014

(54) FILTRATION MEDIA FOR LIQUID FILTRATION

(75) Inventors: W. Douglas Bates, III, Chester, VA (US); Henricus Jacobus Cornelis Gommeren, Hockessin, DE (US); Hageun Suh, Nashville, TN (US)

(73) Assignee: E I du Pont de Nemours and Company, Wilmington, DE (US)

( * ) Notice: Subject to any disclaimer, the term of this patent is extended or adjusted under 35 U.S.C. 154(b) by 592 days.

(21) Appl. No.: 11/240,517

(22) Filed: Sep. 30, 2005

(65) Prior Publication Data

US 2007/0075015 A1  Apr. 5, 2007

(51) Int. Cl.
*B01D 24/00* (2006.01)
*B01D 39/16* (2006.01)
*D04H 13/00* (2006.01)
*D04H 1/54* (2012.01)

(52) U.S. Cl.
CPC .... *B01D 39/1623* (2013.01); *B01D 2239/0258* (2013.01); *B01D 2239/025* (2013.01); *D04H 13/002* (2013.01); *D04H 13/007* (2013.01); *D04H 1/54* (2013.01); *D04H 1/5405* (2013.01)
USPC ..................... 210/500.27; 210/505

(58) Field of Classification Search
CPC ................. B01D 2239/025; B01D 39/1623
USPC ............................ 210/505, 500.27
See application file for complete search history.

(56) References Cited

U.S. PATENT DOCUMENTS 5,922,492 A * 7/1999 Takita et al. ................. 429/249

| 6,395,046 | B1 | 5/2002 | Emig et al. | |
|---|---|---|---|---|
| 6,520,425 | B1 * | 2/2003 | Reneker | 239/294 |
| 6,716,274 | B2 | 4/2004 | Gogins et al. | |
| 6,740,142 | B2 | 5/2004 | Buettner et al. | |
| 2003/0010002 | A1 * | 1/2003 | Johnson et al. | 55/486 |
| 2003/0129909 | A1 | 7/2003 | Zucker | |
| 2003/0137083 | A1 * | 7/2003 | Ko et al. | 264/449 |
| 2003/0177909 | A1 | 9/2003 | Koslow | |
| 2004/0035095 | A1 | 2/2004 | Healey | |
| 2004/0038013 | A1 | 2/2004 | Schaefer et al. | |
| 2004/0038014 | A1 | 2/2004 | Schaefer et al. | |
| 2004/0116019 | A1 | 6/2004 | Zucker et al. | |
| 2004/0116025 | A1 | 6/2004 | Gogins et al. | |

(Continued)

FOREIGN PATENT DOCUMENTS

WO   WO 02/20130     3/2002
WO   WO 03/080905 A1  10/2003

OTHER PUBLICATIONS

"Water Encyclopedia," ed. Jay Lehr et al., pub. John Wiley & Sons, Inc., article entitled "Darcy's Law" by Joseph Holden, vol. 5, pp. 63-64, paragraphs 1-2, 2005.*

(Continued)

*Primary Examiner* — Bobby Ramdhanie
*Assistant Examiner* — Denise R Anderson
(74) *Attorney, Agent, or Firm* — Laurence T. Pearson

(57) ABSTRACT

Filtration media including at least one layer of nanofibers having average diameters less than 1000 nanometers with optional scrim layer(s) are disclosed for filtering particulate matter in liquid. The media achieve flow rates of at least 0.055 L/min/cm$^2$ at relatively high levels of solidity. The media have also advantageously been found to have non-diminishing flow rates as differential pressures increase between 2 psi (14 kPa) and 15 psi (100 kPa).

14 Claims, 2 Drawing Sheets

(56) References Cited

U.S. PATENT DOCUMENTS

| | | |
|---|---|---|
| 2004/0116028 A1 | 6/2004 | Bryner |
| 2004/0261381 A1 | 12/2004 | Heikamp |
| 2005/0006301 A1* | 1/2005 | Angelini et al. .............. 210/490 |
| 2005/0095695 A1* | 5/2005 | Shindler et al. ............ 435/285.1 |

OTHER PUBLICATIONS

"Plastics Engineering, Manufacturing & Data Handbook," by the Plastics Institute of America, vol. 1—Fundamentals and Processes, ed. Dominick V. Rosato et al., pub. Kluwer Academic Publishers, Boston, p. 175, Table 2B.10, 2001.*

Ahmed, T., Reservoir Engineering Handbook, $2^{nd}$ ed., pub. Gulf Professional Publishing, Boston, 2000.*

Nakayama, Y., Introduction to Fluid Mechanics, pub. Butterworth-Heinemann, Oxford, Table 2.3, p. 12, 2000.*

ASTM E1294-89 Abstract, "Standard Test Method for Pore Size Characteristics of Membrane Fitlers Using Automated Liquid Porosimeter," 1989, reapproved 1999, withdrawn 2008.*

ASTM E1294-89 Reference, "Standard Test Method for Pore Size Characteristics of Membrane Fitlers Using Automated Liquid Porosimeter," 1989, reapproved 1999, withdrawn 2008.*

ASTM D1777-96 Abstract, "Standard Test Method for Thickness of Textile Materials," 1996, reapproved in 2002 and 2011.*

U.S. Appl. No. 11/241,598, filed Sep. 30, 2005, Jones et al.

PCT International Serach Report and Written Opinion for International Application No. PCT/US/2006/038096 dated Sep. 29, 2006.

Final Office Action for U.S. Appl. No. 12/504,151 Issued Dec. 19, 2011.

Advances in Pore Structure Evaluation by Porometry. By Akshaya Jena and Krishna Gupta. Chemical Engineering & Technology Journal, Aug. 2010.

Advances in Pore Structure Evaluation by Porometry. By Akshaya Jena and Krishna Gupta. Presentation given by these authors in 2009 at Filtech proceedings.

1977 American society for testing and materials part 32, D1777-64, 1975.

Dry Up Down Test Instruction sheet obtained with capillary flow porosimeter (model No. CFP-34RTF8A-3-6-L4, Porous Materials, Inc. (PMI), Ithaca, NY).

* cited by examiner

FILTRATION MEDIA FOR LIQUID FILTRATION

BACKGROUND OF THE INVENTION

1. Field of the Invention

The present invention relates to filtration media comprising one or more layers of nanofibers. The filtration media are especially suitable for filtering contaminants from liquids.

2. Background

Liquid filtration media are generally categorized in one of two types. One type is fibrous nonwoven media, including but not limited to spunbonded, melt blown or spunlaced nonwoven media formed from continuous fibers, hydroentangled nonwoven media formed from carded staple fiber, and media which is made from a combination of the above technologies. Nonwoven media for liquid filtration have pore sizes greater than 1 μm. The second type of liquid filtration media is porous film membranes which can be used unsupported or in conjunction with a support layer. Filtration membranes have pore sizes less than 0.01 μm and are typically used to accomplish fine filtration tasks such as microfiltration in which particulates in the range of about 0.1 μm to about 10 μm are filtered from the liquid, ultrafiltration in which particulates in the range of about 50 nm to about 0.5 μm are filtered and reverse osmosis in which matter in the range of about 1 Å to about 1 nm is filtered. Nonwoven media and membranes are both suitable for use in microfiltration.

In order to achieve particle retentions equivalent to pore sizes of less than 1 μm with nonwoven media, nonwoven media has been made with increased depth by increasing the number of layers of fibrous material. This desirably results in increased tortuosity of a defect path through which a contaminant particle would have to pass in order to escape capture by the medium and increased contaminant-holding capacity of the medium. Increasing the number of fibrous layers in nonwoven media also undesirably increases the pressure drop or differential pressure across the media in use, which translates to increased energy for the filter user and shorter filter life. Membranes, on the other hand, can offer a combination of good particle retention, pressure drop and flux, but tend to be cost-prohibitive, and do not provide good contaminant-holding capacity over the entire range of pressure drop, therefore limiting the life of filters using membranes.

U.S. Patent Publication Number 20040038014 A discloses a nonwoven filtration medium for filtering contaminants from air or liquids, the medium comprising a single layer or multiple layers of fine fibers. The fine fiber is formed by an electrostatic spinning process utilizing an apparatus including an emitting device and a grid having a high voltage electrostatic field maintained therebetween. A solution of a polymer in a solvent is delivered to the emitting device from which a droplet of the solution is accelerated by the electrostatic field toward the grid, whereupon the solvent evaporates and the polymer is drawn into a fine fiber and collected as a dry fiber on a collection substrate located between the emitting device and the grid.

Synthetic polymers have been formed into webs of very small diameter fibers, i.e., on the order of a few micrometers or less than 1 μm, using various processes including melt blowing, electrostatic spinning and electroblowing. Such webs are useful as liquid barrier materials and filters. Often they are combined with stronger sheets to form composites, the stronger sheets providing the strength to meet the needs of the final filter product.

It would be desirable to have a nonwoven filtration medium suitable for filtering contaminants from liquids that provides an improved combination of pressure drop and flow rate. It is believed that such a medium would provide increased filter longevity.

SUMMARY OF THE INVENTION

In a first embodiment, the present invention is directed to a filtration medium comprising at least one nanofiber layer of polymeric nanofibers wherein the nanofibers have average fiber diameters of less than about 1 μm and the filtration medium has a mean flow pore size of between about 0.5 μm and about 5.0 μm, a solidity of between about 15 vol % and about 90 vol % and a flow rate through the medium of greater than about 0.055 L/min/cm$^2$ of water at 10 psi (69 kPa) differential pressure.

A second embodiment of the present invention is directed to a process for forming a filtration medium comprising the steps of providing a fine fiber spinning apparatus comprising a spinning beam comprising at least one spinning beam comprising a spinning nozzle, a blowing gas injection nozzle and a collector, the spinning beam and the collector having high-voltage electrostatic field maintained therebetween, supplying to the spinning nozzle a polymer solution comprising a polymer and a solvent, compressively discharging the polymer solution from the spinning nozzle and blowing said solution with a blowing gas discharged from said gas injection nozzle to form a fibrous web of nanofibers, and collecting the fibrous web having a basis weight of between about 2 g/m$^2$ and about 100 g/m$^2$, as measured on a dry basis, on a moving collection apparatus in a single pass beneath a single spinning beam.

Another embodiment of the present invention is directed to a filter comprising a filtration medium having at least one nanofiber layer of polymeric nanofibers wherein the nanofibers have average fiber diameters of less than about 1 μm and the filtration medium has a mean flow pore size of between about 0.5 μm and about 5.0 μm, a solidity of between about 15 vol % and about 90 vol % and a flow rate through the medium of greater than about 0.055 L/min/cm$^2$ of water at 10 psi (69 kPa) differential pressure.

Another embodiment of the present invention is directed to a method of removing particulates from a liquid comprising passing the liquid containing particulates through a filtration medium comprising at least one nanofiber layer of polymeric nanofibers wherein the nanofibers have average fiber diameters of less than about 1 μm and the filtration medium has a mean flow pore size of between about 0.5 μm and about 5.0 μm, a solidity of between about 15 vol % and about 90 vol % and a flow rate through the medium of greater than about 0.055 L/min/cm$^2$ of water at 10 psi (69 kPa) differential pressure.

BRIEF DESCRIPTION OF THE DRAWINGS

The accompanying drawings, which are incorporated in and constitute a part of this specification, illustrate the presently contemplated embodiments of the invention and, together with the description, serve to explain the principles of the invention.

DETAILED DESCRIPTION OF THE INVENTION

The present invention relates to filtration media for removing fouling agents or contaminants from a liquid, the filtration media including at least one nanofiber layer, a process for forming the filtration media, and a process of removing particulates from a liquid.

The term "nanofibers" refers to fibers having diameters varying from a few tens of nanometers up to several hundred nanometers, but generally less than one micrometer.

The terms "filter medium" or "filter media" refer to a material or collection of material through which a particulate-carrying fluid passes, with a concomitant and at least temporary deposition of the particulate material in or on the material.

The terms "flux" and "flow rate" are used interchangeably to refer to the rate at which a volume of fluid passes through a filtration medium of a given area.

The filtration medium of the present invention includes at least one nanofiber layer of polymeric nanofibers. The nanofibers have average fiber diameters of less than about 1 µm, preferably between about 0.1 µm and about 1 µm. The filtration medium has a mean flow pore size of between about 0.5 µm and about 5.0 µm. The filtration medium has a solidity of at least about 15 vol %, even between about 15 vol % and about 90 vol %, and even between about 30 vol % and about 75 vol %. The filtration medium has a flow rate through the medium of greater than about 0.055 L/min/cm$^2$ of water at 10 psi (69 kPa) differential pressure. The filtration medium has a thickness of between about 10 µm and about 600 µm, even between about 30 µm and about 130 µm. The filtration medium has a basis weight of between about 2 g/m$^2$ and about 100 g/m$^2$, even between about 15 g/m$^2$ and about 90 g/m$^2$.

The filtration medium can consist solely of nanofibers or it can be a combination of a nanofiber layer with a porous substrate (also referred to as a scrim) for structural support.

Polymers suitable for use in the invention include thermoplastic and thermosetting polymers. Polymers suitable for use in the invention include, but are not limited to, polyimide, aliphatic polyamide, aromatic polyamide, polysulfone, cellulose acetate, polyether sulfone, polyurethane, poly(urea urethane), polybenzimidazole, polyetherimide, polyacrylonitrile, poly(ethylene terephthalate), polypropylene, polyaniline, poly(ethylene oxide), poly(ethylene naphthalate), poly(butylene terephthalate), styrene butadiene rubber, polystyrene, poly(vinyl chloride), poly(vinyl alcohol), poly(vinylidene fluoride), poly(vinyl butylene), copolymers or derivative compounds thereof, and combinations thereof.

Figure 1:
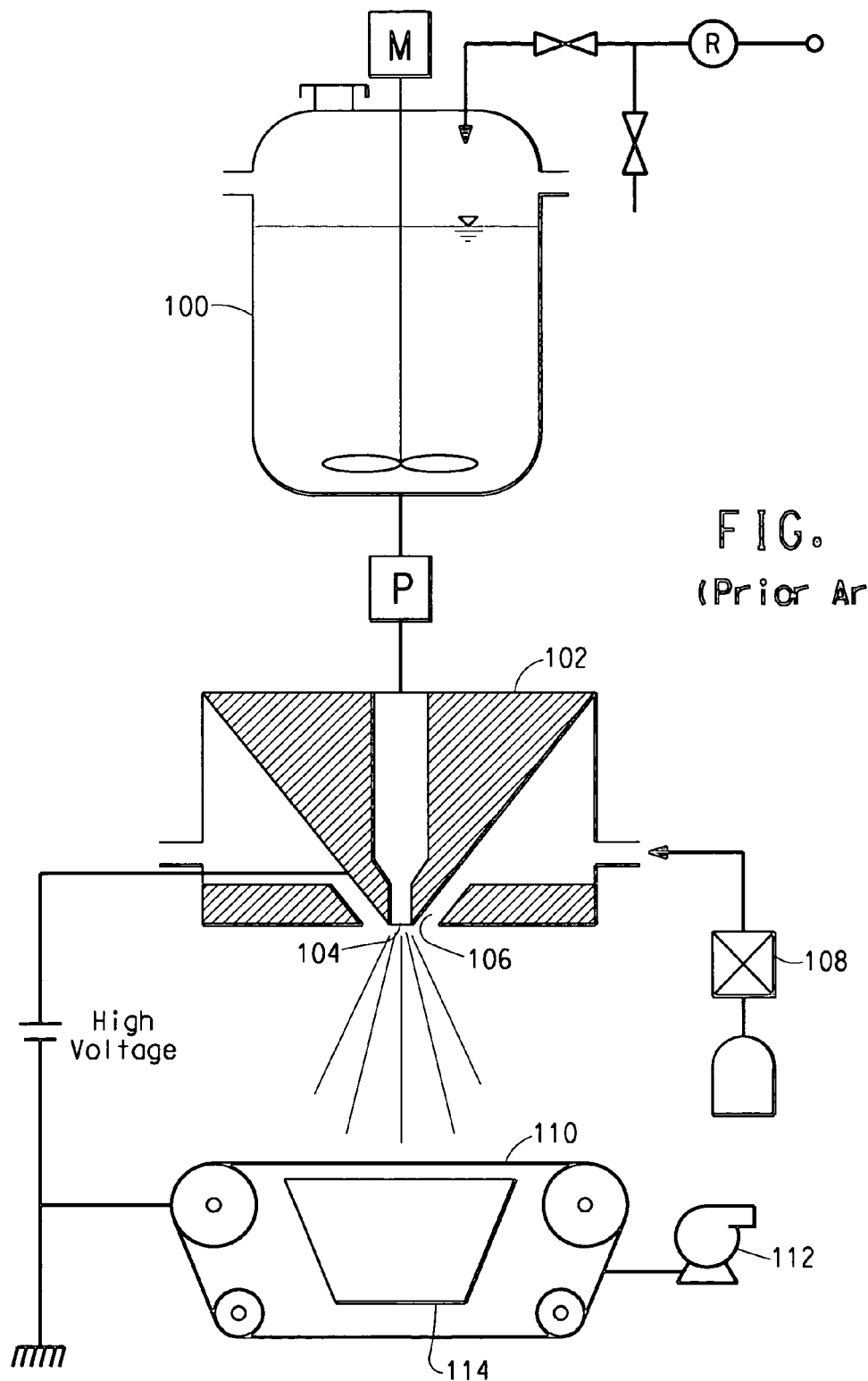
FIG. 1 is a schematic of a prior art nanofiber web preparing apparatus for preparing a filtration medium according to the invention.

The process for making the nanofiber layer(s) of the filtration medium is disclosed in International Publication Number WO2003/080905 (U.S. Ser. No. 10/822,325), which is hereby incorporated by reference. FIG. 1 is a schematic diagram of an electroblowing apparatus useful for carrying out the process of the present invention using electroblowing (or "electro-blown spinning") as described in International Publication Number WO2003/080905. This prior art electroblowing method comprises feeding a solution of a polymer in a solvent from mixing chamber 100, through a spinning beam 102, to a spinning nozzle 104 to which a high voltage is applied, while compressed gas is directed toward the polymer solution in a blowing gas stream 106 as it exits the nozzle to form nanofibers and collecting the nanofibers into a web on a grounded collector 110 under vacuum created by vacuum chamber 114 and blower 112.

In one embodiment of the present invention, the filtration medium comprises a single nanofiber layer made by a single pass of a moving collection apparatus positioned between the spinning beam and the collector through the process. It will be appreciated that the fibrous web can be formed by one or more spinning beams running simultaneously above the same moving collection apparatus.

In one embodiment of the invention, a single nanofiber layer is made by depositing nanofibers from a single spinning beam in a single pass of the moving collection apparatus, the nanofiber layer having a basis weight of between about 2 g/m$^2$ and about 100 g/m$^2$, even between about 10 g/m$^2$ and about 90 g/m$^2$, and even between about 20 g/m$^2$ and about 70 g/m$^2$, as measured on a dry basis, i.e., after the residual solvent has evaporated or been removed.

The moving collection apparatus is preferably a moving collection belt positioned within the electrostatic field between the spinning beam 102 and the collector 110. After being collected, the single nanofiber layer is directed to and wound onto a wind-up roll on the downstream side of the spinning beam.

In one embodiment of the invention, any of a variety of porous substrates can be arranged on the moving collection belt to collect and combine with the nanofiber web spun on the substrate so that the resulting composite of the nanofiber layer and the porous substrate is used as the filtration medium of the invention. Examples of the porous substrate include spunbonded nonwovens, meltblown nonwovens, needle punched nonwovens, spunlaced nonwovens, wet laid nonwovens, resin-bonded nonwovens, woven fabrics, knit fabrics, apertured films, paper, and combinations thereof.

The collected nanofiber layer(s) are advantageously bonded. Bonding may be accomplished by known methods, including but not limited to thermal calendering between heated smooth nip rolls, ultrasonic bonding, and through gas bonding. Bonding increases the strength and the compression resistance of the medium so that the medium may withstand the forces associated with being handled, being formed into a useful filter, and being used in a filter, and depending on the bonding method used, adjusts physical properties such as thickness, density, and the size and shape of the pores. For instance, thermal calendering can be used to reduce the thickness and increase the density and solidity of the medium, and reduce the size of the pores. This in turn decreases the flow rate through the medium at a given applied differential pressure. In general, ultrasonic bonding bonds a smaller area of the medium than thermal calendering, and therefore has a lesser effect on thickness, density and pore size. Through gas bonding generally has minimal effect on thickness, density and pore size, therefore this bonding method may be preferable in applications in which maintaining high flow rate is most important.

When thermal calendering is used, care must be taken not to over-bond the material, such that the nanofibers melt and no longer retain their structure as individual fibers. In the extreme, over-bonding would result in the nanofibers melting completely such that a film would be formed. One or both of the nip rolls used is heated to a temperature of between about ambient temperature, e.g., about 25° C., and about 300° C., even between about 50° C. and about 200° C. The nanofiber layer(s) are compressed between the nip rolls at a pressure of between about 0 lb/in and about 1000 lb/in (178 kg/cm), even between about 50 lb/in (8.9 kg/cm) and about 550 lb/in (98 kg/cm). The nanofiber layer(s) are advantageously compressed at a line speed of at least about 10 ft/min (3 m/min), even at least about 30 ft/min (9 m/min). Calendering conditions, e.g., roll temperature, nip pressure and line speed, can be adjusted to achieve the desired solidity. In general, application of higher temperature, pressure, and/or residence time under elevated temperature and/or pressure results in increased solidity. In some instances, it is desirable to lightly calender the collected nanofiber layer(s) at a temperature of about 65° C. or less, a nip pressure of less than about 100 lb/in (17.8 kg/cm), a line speed of greater than about 30 ft/min (9 m/min), or a combination of said conditions, resulting in a filter medium having a solidity of between about 15 vol % and about 30 vol %.

TEST METHODS

Basis Weight was determined by ASTM D-3776, which is hereby incorporated by reference and reported in g/m².

Solidity was calculated by dividing the basis weight of the sample in g/m² by the polymer density in g/cm³ and by the sample thickness in micrometers and multiplying by 100, i.e., solidity=basis weight/(density×thickness)×100.

Fiber Diameter was determined as follows. Ten scanning electron microscope (SEM) images at 5,000× magnification were taken of each nanofiber layer sample. The diameter of eleven (11) clearly distinguishable nanofibers were measured from each SEM image and recorded. Defects were not included (i.e., lumps of nanofibers, polymer drops, intersections of nanofibers). The average fiber diameter for each sample was calculated.

Thickness was determined by ASTM D1777-64, which is hereby incorporated by reference, and is reported in micrometers.

Minimum Pore Size was measured according to ASTM Designation E 1294-89, "Standard Test Method for Pore Size Characteristics of Membrane Filters Using Automated Liquid Porosimeter" which approximately measures pore size characteristics of membranes with a pore size diameter of 0.05 µm to 300 µm by using automated bubble point method from ASTM Designation F 316 using a capillary flow porosimeter (model number CFP-34RTF8A-3-6-L4, Porous Materials, Inc. (PMI), Ithaca, N.Y.). Individual samples of different size (8, 20 or 30 mm diameter) were wetted with low surface tension fluid (1,1,2,3,3,3-hexafluoropropene, or "Galwick," having a surface tension of 16 dyne/cm). Each sample was placed in a holder, and a differential pressure of air was applied and the fluid removed from the sample. The minimum pore size is the last pore to open after the compressed pressure is applied to the sample sheet, and is calculated using software supplied from the vendor.

Mean Flow Pore Size was measured according to ASTM Designation E 1294-89, "Standard Test Method for Pore Size Characteristics of Membrane Filters Using Automated Liquid Porosimeter." Again, individual samples of different size (8, 20 or 30 mm diameter) were wetted with the low surface tension fluid as described above and placed in a holder, and a differential pressure of air was applied and the fluid removed from the sample. The differential pressure at which wet flow is equal to one-half the dry flow (flow without wetting solvent) is used to calculate the mean flow pore size using supplied software.

Bubble Point was measured according to ASTM Designation F316, "Standard Test Methods for Pore Size Characteristics of Membrane Filters by Bubble Point and Mean Flow Pore Test." Individual samples (8, 20 or 30 mm diameter) were wetted with the low surface tension fluid as described above. After placing the sample in the holder, differential pressure (air) is applied and the fluid is removed from the sample. The bubble point is the first open pore after the compressed air pressure is applied to the sample sheet and is calculated using vendor supplied software.

Flow Rate (also referred to as Flux) is the rate at which fluid passes through the sample of a given area and was measured by passing deionized water through filter medium samples having a diameter of 8 mm. The water was forced through the samples using hydraulic pressure (water head pressure) or pneumatic pressure (air pressure over water). The test uses a fluid filled column containing a magnetic float, and a sensor attached to the column reads the position of the magnetic float and provides digital information to a computer. Flow rate is calculated using data analysis software supplied by PMI.

EXAMPLES

Hereinafter the present invention will be described in more detail in the following examples. An electro-blown spinning or electroblowing process and apparatus for forming a nanofiber web of the invention as disclosed in PCT publication number WO 2003/080905, as illustrated in FIG. 1 hereof, was used to produce the nanofiber layers and webs of the Examples below.

Nanofiber layers were made by electroblowing a solution of nylon 6,6 polymer having a density of 1.14 g/cc (available from E. I. du Pont de Nemours and Company, Wilmington, Del.) at 24 weight percent in formic acid at 99% purity (available from Kemira Oyj, Helsinki, Finland). The polymer and solvent were fed into a solution mix tank, the solution transferred into a reservoir and metered through a gear pump to an electroblowing spin pack having a series of spinning nozzles and gas injection nozzles. The spin pack was maintained at temperatures between about 13° C. and about 26° C. with the pressure of the solution in the spinning nozzles between about 9 bar and about 13 bar. The spinneret was electrically insulated and applied with a voltage of 65 kV. Compressed air at a temperature of between about 34° C. and about 79° C. was injected through the gas injection nozzles from the spin pack at a rate of about 4.7 m³/min to about 6 m³/min and a pressure of between 240 mm $H_2O$ and about 410 mm $H_2O$. The fibers exited the spinning nozzles into air at atmospheric pressure, a relative humidity of between about 50% and about 72% and a temperature of between about 13° C. and about 24° C. The fibers were laid down the distance of between about 300 mm and about 360 mm below the exit of the pack onto a porous belt moving at a speed of about 2.0 m/min to about 15 m/min. A vacuum chamber beneath the porous belt assisted in the laydown of the fibers.

Example 1

Layers of nanofibers were made. The spin pack was at a temperature of 21° C. with the pressure of the solution in the spinning nozzles at 10 bar (1000 kPa). Compressed air at a temperature of 70° C. was injected through the gas injection nozzles from the spin pack at a rate of 5 m³/min and a pressure of 400 mm $H_2O$. The fibers were laid down 330 mm below the exit of the pack onto a porous belt moving at 15 m/min. The nanofiber layer sample was made without a scrim, by depositing the fibers directly onto the moving collection belt, in five passes of the moving belt under the spin pack. Each layer of nanofibers had a target basis weight of about 5 g/m². The nanofiber layer sample was bonded according to the conditions shown in Table 1.

Examples 2-4

Layers of nanofibers were made substantially as set forth in Example 1, except that the spin pack was at a temperature of 26° C., with the pressure of the solution in the spinning nozzles at 12 bar (1200 kPa), and the compressed air was supplied at a temperature of 54° C., at a rate of 5.7 m³/min and a pressure of 320 mm $H_2O$. The fibers were laid down 330 mm below the exit of the pack onto a porous belt moving at 7.4 m/min. The nanofiber layer samples were made without a scrim, by depositing the fibers directly onto the moving collection belt, in four passes of the moving belt under the spin pack. Each layer of nanofibers had a target basis weight of about 10 g/m². The nanofiber layer samples were bonded according to the conditions shown in Table 1.

Examples 5-7

Layers of nanofibers were made substantially as set forth in Example 1, except that the spin pack was at a temperature of 20° C., with the pressure of the solution in the spinning nozzles at 12 bar (1200 kPa), and the compressed air was supplied at a temperature of 35° C., at a rate of 5 m³/min and a pressure of 280 mm H₂O. The fibers were laid down 300 mm below the exit of the pack onto a porous belt moving at 11.3 m/min. The nanofiber layer samples were made without a scrim, by depositing the fibers directly onto the moving collection belt, in five passes of the moving belt under the spin pack. Each layer of nanofibers had a target basis weight of about 5 g/m². The nanofiber layer samples were bonded according to the conditions shown in Table 1.

Example 8

Layers of nanofibers were made substantially as set forth in Example 1, except that the spin pack was at a temperature of 24° C., with the pressure of the solution in the spinning nozzles at 11 bar (1100 kPa), and the compressed air was supplied at a temperature of 59° C., at a rate of 5.5 m³/min and a pressure of 330 mm H₂O. The fibers were laid down 330 mm below the exit of the pack onto a porous belt moving at 14.7 m/min. The nanofiber layer sample was made without a scrim, by depositing the fibers directly onto the moving collection belt, in thirteen passes of the moving belt under the spin pack. Each layer of nanofibers had a target basis weight of about 5 g/m². The nanofiber layer sample was bonded according to the conditions shown in Table 1.

It is believed that the filter medium of the present invention is able to provide the loft necessary to retain a high mass of particulates before reaching an undesirable pressure drop. The filter medium is able to provide a higher flow rate and/or lower pressure drop at a given retention of particulates as compared with known membranes.

Media according to the present invention are useful in the food and beverage, pharmaceuticals, biotechnology, microelectronics, chemical processing, water treatment, and other liquid treatment industries.

What is claimed is:

1. A filtration medium comprising at least one nanofiber layer of polymeric nanofibers wherein the nanofibers have average fiber diameters of less than about 1 μm and the nanofiber layer has a mean flow pore size of between about 0.5 μm and about 5.0 μm, a solidity of between 70.1 vol % and 87.3 vol % and a liquid flow rate through the medium of at least about 0.055 L/min/cm² of water at 10 psi (69 kPa) differential pressure.

2. The filtration medium of claim 1 wherein the filtration medium has a thickness of between about 10 μm and about 600 μm.

3. The filtration medium of claim 1 wherein the nanofiber layer has a basis weight of between about 2 g/m² and about 100 g/m².

4. The filtration medium of claim 1 further comprising a supporting scrim layer.

5. The filtration medium of claim 4 wherein the supporting scrim layer is selected from the group consisting of spunbonded nonwovens, meltblown nonwovens, needle punched nonwovens, spunlaced nonwovens, wet laid nonwovens, resin-bonded nonwovens, woven fabrics, knit fabrics, apertured films, paper, and combinations thereof.

6. The filtration medium of claim 1 wherein the nanofibers have average fiber diameters of about 0.10 μm to about 1 μm.

TABLE 1

| | Calender Conditions | | | | | | Specific Flow Rate | | | |
|---|---|---|---|---|---|---|---|---|---|---|
| Ex. No. | Temp. ° C. | Press. lb/in (kg/cm) | Line Speed ft/min (m/min) | Fiber Dia. nm | Basis Wt. g/m² | Thickness μm | Solidity vol % | at ΔP of 10 psi (69 kPa) mL/min/cm² | Min. Pore Size μm | Mean Flow Pore Size μm | Bubble Point μm |
| 1 | 65 | 100 (18) | 30 (9) | 999 | 30.4 | 70 | 38.1 | 270 | 2.12 | 2.25 | 6.07 |
| 2 | 65 | 300 (53) | 20 (6) | 713 | 49.6 | 70 | 62.1 | 130 | 0.84 | 1.02 | 4.42 |
| 3 | 125 | 300 (53) | 20 (6) | 713 | 50.8 | 70 | 63.6 | 63 | 0.26 | 0.69 | 2.39 |
| 4 | 125 | 300 (53) | 20 (6) | 713 | 51.2 | 70 | 64.1 | 71 | 0.28 | 0.63 | 2.24 |
| 5 | 65 | 100 (18) | 10 (3) | 422 | 29.5 | 60 | 43.2 | 100 | 1.2 | 1.25 | 3.46 |
| 6 | 65 | 500 (89) | 30 (9) | 422 | 29.1 | 40 | 63.9 | 120 | 1.25 | 1.28 | 3.59 |
| 7 | 185 | 100 (18) | 10 (3) | 422 | 29.8 | 30 | 87.3 | 210 | 0.38 | 0.63 | 2.08 |
| 8 | 125 | 300 (53) | 20 (6) | 695 | 88.1 | 100 | 77.3 | 55 | 0.38 | 0.55 | 1.89 |

In each of the Examples, the single nanofiber layers cannot be pulled apart into more than one layer of nanofibers by ordinary means.

Figure 2:
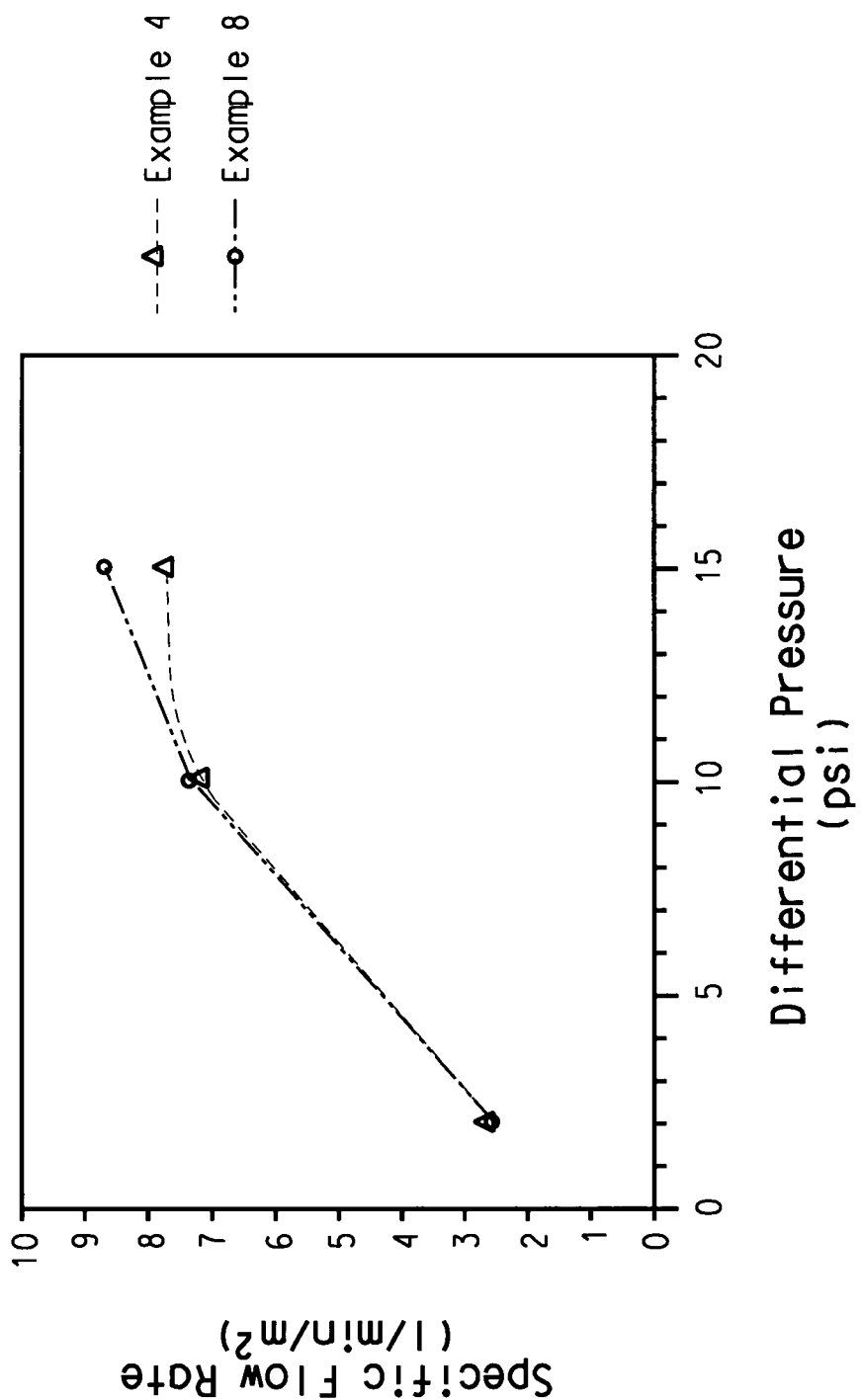
FIG. 2 is a graph of specific flow rate versus differential pressure across filter media according to the invention.

The liquid flow rates were found to be surprisingly high for solidity levels greater than 30 vol %. The specific flow rate at applied differential pressure of between 2 psi (14 kPa) and 15 psi (100 kPa) was plotted versus differential pressure for Examples 4 and 8. As can be seen from the graph of FIG. 2, the ratio of the change in flow rate through the medium to the corresponding change in differential pressure across the medium is positive throughout this range of differential pressure. In other words, as the differential pressure increases in this range, the flow rate also increases. This is an advantage of the medium of the present invention since flow through a filter including the medium of the invention, and therefore the filter life, is not limited by the pressure drop within this range.

7. The filtration medium of claim 1 wherein the polymeric nanofibers comprise a polymer selected from the group consisting of polyimide, aliphatic polyamide, aromatic polyamide, polysulfone, cellulose acetate, polyether sulfone, polyurethane, poly(urea urethane), polybenzimidazole, polyetherimide, polyacrylonitrile, poly(ethylene terephthalate), polypropylene, polyaniline, poly(ethylene oxide), poly (ethylene naphthalate), poly(butylene terephthalate), styrene butadiene rubber, polystyrene, poly(vinyl chloride), poly(vinyl alcohol), poly(vinylidene fluoride), poly(vinyl butylene) and copolymers or derivative compounds thereof.

8. The filtration medium of claim 1 that consists solely of nanofibers.

9. The filtration medium of claim 1 wherein the nanofiber layer has a basis weight of at least about 5 g/m².

10. The filtration medium of claim 1 wherein the nanofiber layer has a basis weight of between about 10 g/m² and about 90 g/m².

11. A filter comprising a filtration medium having at least one nanofiber layer of polymeric nanofibers wherein the nanofibers have average fiber diameters of less than about 1 µm and the nanofiber layer has a mean flow pore size of between about 0.5 µm and about 5.0 µm, a solidity of between 70.1 vol % and 87.3 vol % and a liquid flow rate through the medium of at least about 0.055 L/min/cm² of water at 10 psi (69 kPa) differential pressure.

12. A process for forming the filtration medium of claim 1, comprising the steps of: providing a fine fiber spinning apparatus comprising a spinning beam comprising at least one spinning beam comprising a spinning nozzle, a blowing gas injection nozzle and a collector, the spinning beam and the collector having high-voltage electrostatic field maintained therebetween; supplying to the spinning nozzle a polymer solution comprising a polymer and a solvent; compressively discharging the polymer solution from the spinning nozzle and blowing said solution with a blowing gas discharged from said gas injection nozzle to form a fibrous web of nanofibers; and collecting the fibrous web having a basis weight of between about 2 g/m² and about 100 g/m², as measured on a dry basis, on a moving collection apparatus in a single pass beneath a single spinning beam.

13. The process of claim 12, further comprising calendering the fibrous web between smooth nip rolls at a temperature of between about 25° C. and about 300° C. and a pressure of between about 0 lb/in and about 1000 lb/in (178 kg/cm).

14. A method of removing particulates from a liquid comprising passing the liquid containing particulates through a filtration medium comprising at least one nanofiber layer of polymeric nanofibers wherein the nanofibers have average fiber diameters of less than about 1 µm and the nanofiber layer has a mean flow pore size of between about 0.5 µm and about 5.0 µm, a solidity of between 70.1 vol % and 87.3 vol % and a liquid flow rate through the medium of at least about 0.055 L/min/cm² of water at 10 psi (69 kPa) differential pressure.

* * * * *